Figure 1:
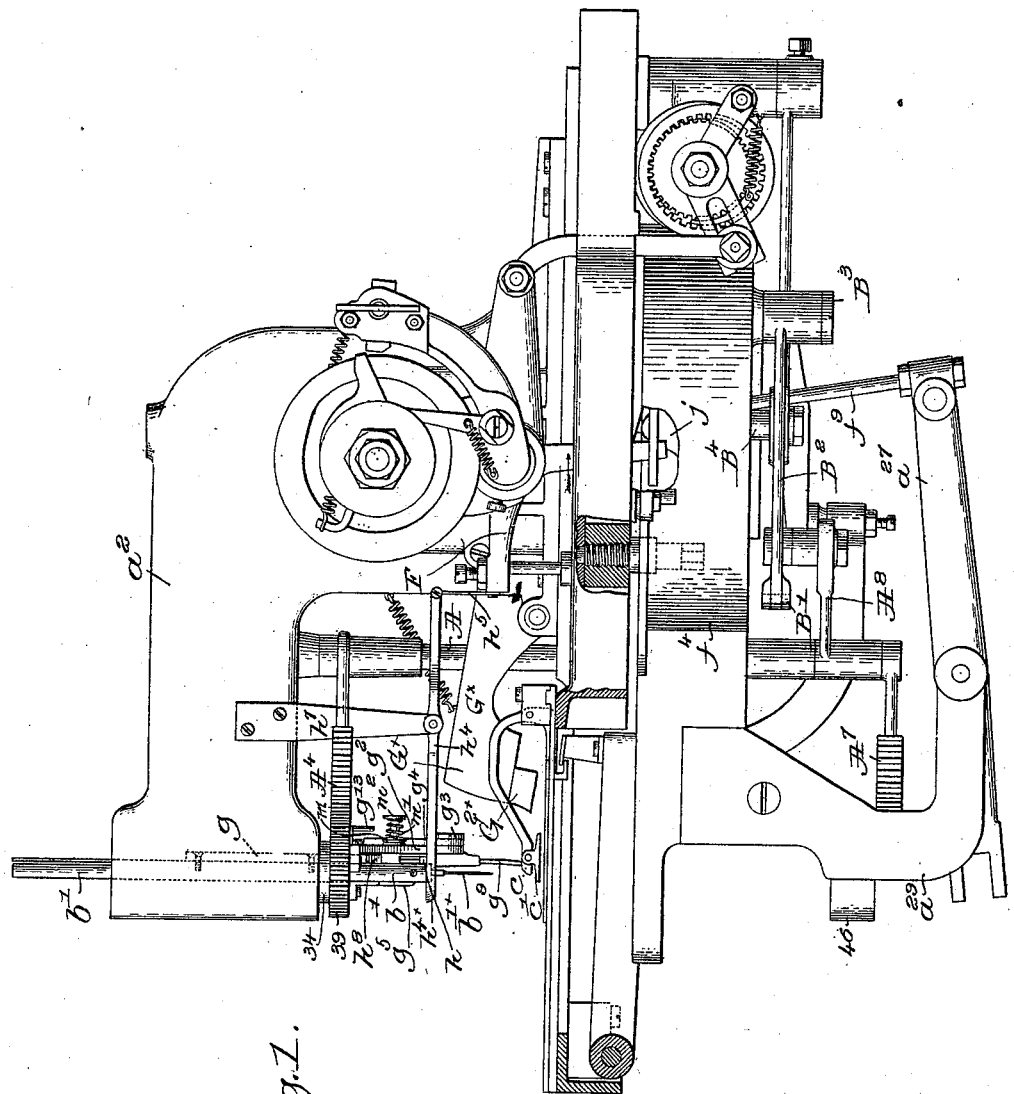

No. 684,046. Patented Oct. 8, 1901.
C. A. DAHL & W. W. DIXON.
OVEREDGE STITCHING MACHINE.
(Application filed Jan. 7, 1901.)

(No Model.) 5 Sheets—Sheet 1.

Witnesses:
Fred S. Greenleaf
Edward F. Allen

Inventors.
Charles A. Dahl,
William W. Dixon,
by Crosby & Gregory
attys.

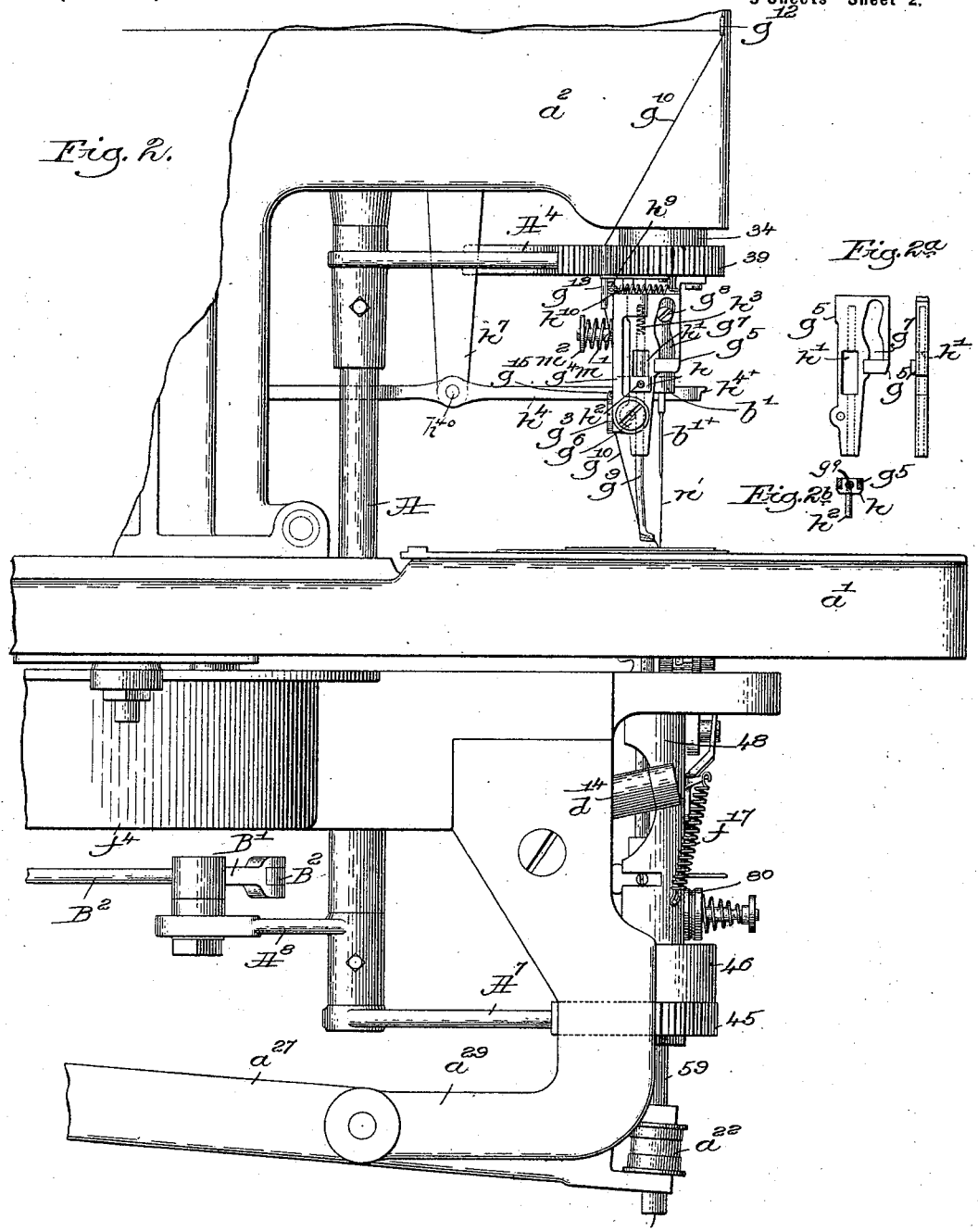

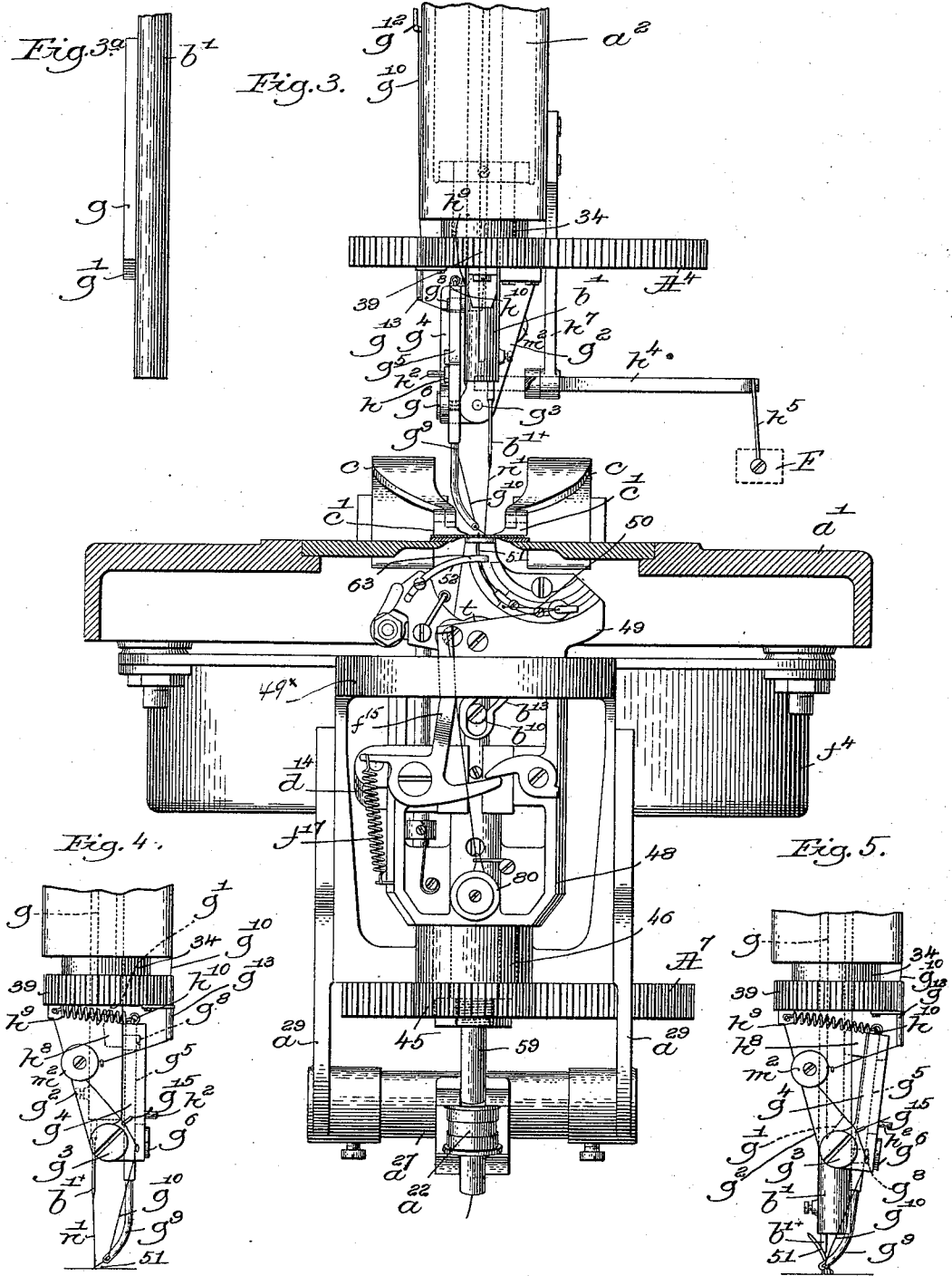

No. 684,046. Patented Oct. 8, 1901.
C. A. DAHL & W. W. DIXON.
OVEREDGE STITCHING MACHINE.
(Application filed Jan. 7, 1901.)

(No Model.) 5 Sheets—Sheet 4.

Witnesses:
Fred S. Greenleaf
Edward G. Allen

Inventors.
Charles A. Dahl,
William W. Dixon,
by Crosby & Gregory
Attys.

No. 684,046. Patented Oct. 8, 1901.
C. A. DAHL & W. W. DIXON.
OVEREDGE STITCHING MACHINE.
(Application filed Jan. 7, 1901.)
(No Model.) 5 Sheets—Sheet 5.
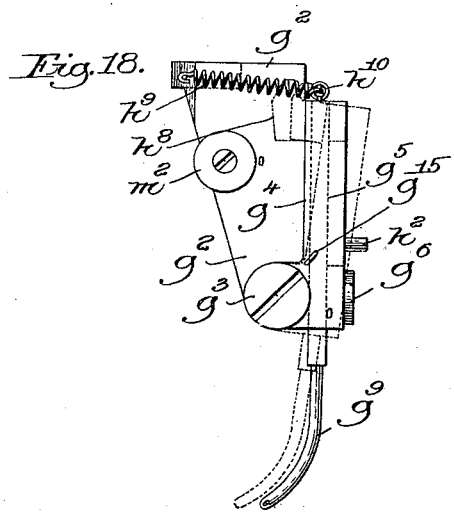
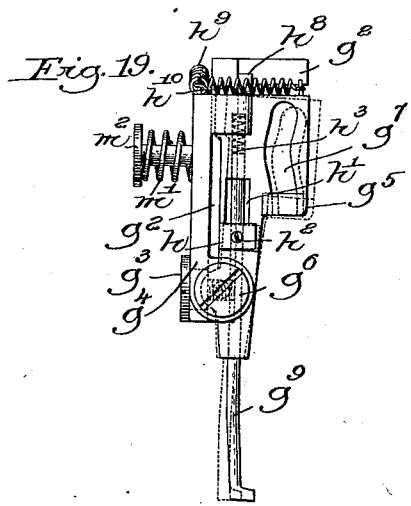
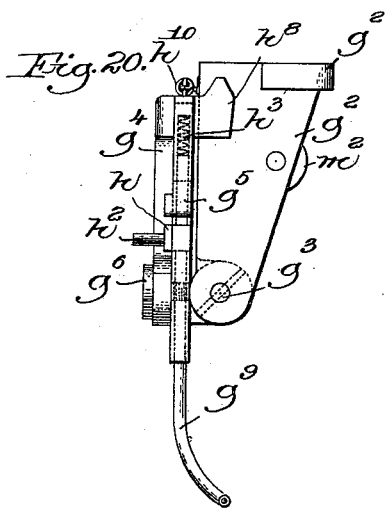
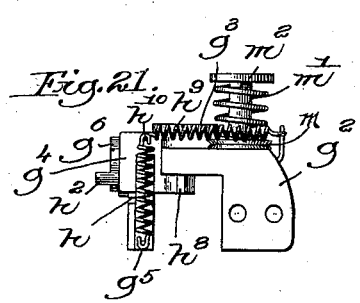

UNITED STATES PATENT OFFICE.

CHARLES A. DAHL, OF LYNN, AND WILLIAM W. DIXON, OF BOSTON, MASSACHUSETTS, ASSIGNORS TO REECE BUTTONHOLE MACHINE COMPANY, OF PORTLAND, MAINE, AND BOSTON, MASSACHUSETTS.

OVEREDGE STITCHING-MACHINE.

SPECIFICATION forming part of Letters Patent No. 684,046, dated October 8, 1901.

Application filed January 7, 1901. Serial No. 42,349. (No model.)

*To all whom it may concern:*

Be it known that we, CHARLES A. DAHL, a resident of Lynn, county of Essex, and WILLIAM W. DIXON, a resident of Boston, county of Suffolk, State of Massachusetts, citizens of the United States, have invented an Improvement in Overedge Stitching-Machines, of which the following description, in connection with the accompanying drawings, is a specification, like characters on the drawings representing like parts.

This invention has for its object to improve that class of overedge stitching-machines wherein either the stitch-frame or the cloth-clamp is moved longitudinally of the length of the buttonhole in overstitching the sides of the same, either the stitch-forming mechanism or the cloth-clamp being revolved while stitching about the eye of the buttonhole.

Prior to this invention in machines using a clamp to hold the garment to be overstitched it has been common to apply the garment to the cloth-clamp in such manner that the outer face of the garment is undermost in the clamp, this being done for the reason that the crossing or interlacing points of the upper and under threads, which constitute the so-called "purl," is effected at the edge of the slit in the material only at its under side, the interlacing of said threads at the exposed face of the material being made back from the edge of the material at a distance therefrom equal to the length of the depth-stitch, and it has also been common to apply the cord to the side of the garment undermost in the clamp.

When the garment is held in the clamp with what is to be its outer face undermost, it will be understood that the stitching which is to show as the finished edge of the buttonhole at the face of the fabric is concealed from the view of the operator during the overstitching operation, and consequently any variations due to imperfect stitching arising from tension or otherwise can be discovered only after the garment has been removed from the clamp. After the removal of the garment from the clamp, a series of buttonholes having been completed, each buttonhole made as described has to be finished at what is to be its face edge by cutting off the cord and the under thread left connecting the ends of the series of buttonholes, and the ends of said threads are connected with the cloth by a barring-stitch made by hand or by a stitch made by a barring-machine.

We have aimed to produce a machine wherein the outer face of the garment held in the clamp may be exposed to the operator while the buttonhole is being stitched, so that the operator may readily detect any error in stitching or otherwise and correct the same, and the threads of the usual stitch-making parts so coöperate with a novel purl-thread guide that the threads of the stitch are drawn by the purl-thread to bring their crossing-points or the purl at the edge of the slit or hole exposed at the upper side of the garment as well as at the under side, and by keeping the cord at the under side of the material the buttonhole made will present at its upper side, which is to be the outer face of the garment or material, a finished appearance with the exception of the bar, which may be made, if desired, in usual manner.

In our improved machine with the inner side of the garment or material down in the clamp and the outer side uppermost and exposed the edge of the slit or hole at the said inner side presents in usual manner a purl, and by the employment of the purl-thread guide the edge of the slit at the exposed upper side of the garment or material, the outer side thereof in use, also shows a purl, this last purl being effected by the stress of the purl-thread which is presented to the upper side of the material and is made to enter into the formation of the overedge-stitch.

Figure 6:
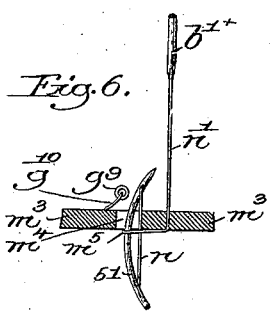
Figure 7:
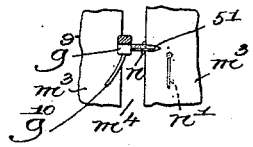
Figure 10:
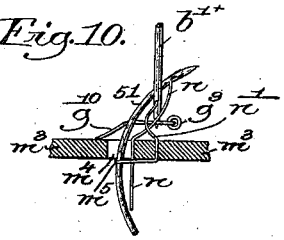
Figure 11:
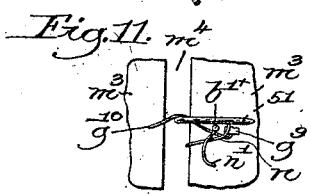
Figure 16:
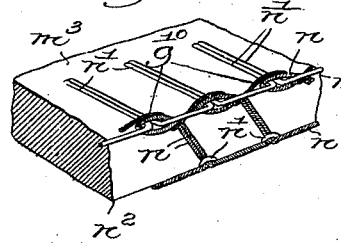
Figure 14:
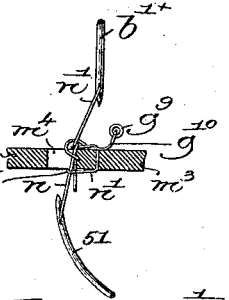
Figure 15:
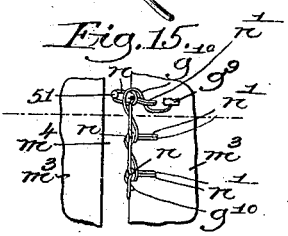
Figure 8:
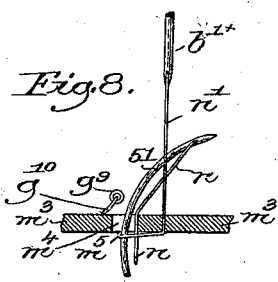
Figure 9:
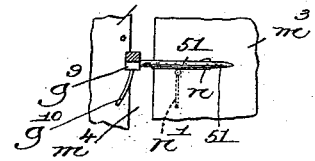
Figure 12:
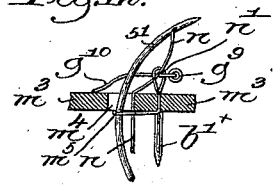
Figure 13:
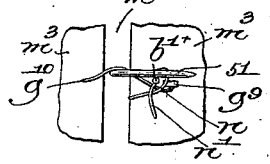
Figure 17:
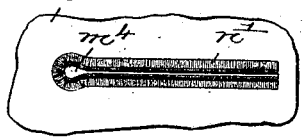

Figure 1 is a partial side elevation of a sufficient portion of a well-known type of overedge stitching mechanism to enable our invention to be understood, said figure showing a cloth-clamp of usual construction by which to hold the garment or material having the edge to be overstitched. Fig. 2, enlarged, also shows a partial opposite side elevation of a well-known type of machine with our improvements added; Fig. 2$^a$, a detail showing the member $g^5$ detached; Fig. 2$^b$, a section in the line $x$, Fig. 2$^a$, to show the block $h$ in the member $g^5$; Fig. 2$^c$, a detail showing the front end of the device $h^4$ and the needle-bar. Fig. 3 is a front elevation, partly in section, of part of the machine represented in Fig. 2. Fig. 3$^a$ is a detail showing the cam-bar connected with the usual needle-bar. Figs. 4 and 5 are details of the upper needle and the purl-thread guide, the said parts being shown in different positions, Fig. 5 showing the under-thread carrier as occupying a position above the material or garment. Figs. 6 and 7 are diagrams in elevation and plan, showing a piece of material or part of a garment having a buttonhole-slit to be overstitched, and the upper needle, the lower-thread carrier, and part of the purl-thread guide. Figs. 8 and 9 show the same parts in yet another position in the formation of the buttonhole-stitch. Figs. 10 and 11 show yet another position of said parts; Figs. 12 and 13, yet other positions of said parts; Figs. 14 and 15, yet other positions. Fig. 16 shows a piece of material with the stitches separated to show the particular concatenation of the threads. Fig. 17 shows a completed buttonhole as viewed from the outer or face side of the garment. Figs. 18 to 21 show in different positions the purl-thread guide detached.

We have chosen herein to illustrate our invention as embodied in connection with a class of overedge stitching-machine of the so-called "Reece" type, substantially as represented in United States Patent No. 655,637, dated August 7, 1900, and with the particular form of such type of machine which is represented in application, Serial No. 679,412, filed May 2, 1898, made by one of us; but it will be understood that our invention may with but slight changes be applied to other types of overedge stitching-machines.

Referring to the drawings, the stitch-frame $a^2$, the clamp-frame $a'$, the casing 34, having the connected pinion 39, the needle-bar $b'$, having an eye-pointed needle $b'^\times$ to receive the upper thread $n'$ and movable vertically in said casing and pinion, the curb or casing 46, secured to the stitch-frame $a$, movable relatively to the clamp-frame while stitching the side edges of a buttonhole-slit, the pinion 45, the actuating-cam $j$, worm-toothed at its edge, the curb $f^4$, attached to or forming a part of the stitch-frame, the upright shaft A, having the connected toothed sectors $A^4 A^7$, engaging the pinions 39 and 45 to rotate fully or more than fully the stitch-forming means while overstitching the curved parts of a buttonhole or it may be an eyelet-hole, the lever $B^2$, pivoted at $B^3$ and having a stud $B^4$, which enters a cam-groove (not shown) in the bottom of the cam $j$, the link $B'$, connected with said lever $B^2$ and with a stud of the arm $A^8$, extended backwardly from the sector $A^7$, the three-armed lever F, moved automatically when the stitch-frame and stitch-forming means are to be started to start a buttonhole and stopped after the completion of each hole, the cutter-carrier $G^\times$, having a cutter $G^{2\times}$, and the means for actuating said parts are and may be all substantially as shown and described in said patent. The block 48, having an extension entering the pinion 45 and having a circular portion and an extension 49, provided with a raceway 50, said circular part being embraced by the circular loop $49^\times$ of the stitch-frame, the lever $a^{27}$, pivotally mounted upon a depending bracket $a^{29}$ and moved by a rod $f^9$, the outer end of said lever being formed to receive the ball-shaped portion $a^{22}$ of a rod 59, adapted to be slid vertically to effect the movement of a lever $d^{14}$, employed to slide in said raceway, a carriage 50, carrying the complemental under-thread carrier, (represented as a curved needle 51,) the looper 63 and the means for imparting movement thereto, including a slotted lever $b^{13}$ and a stud $b^{10}$, the take-up $f^{15}$ for the under thread $n$, and the tension device 80 for said under thread are and may be all substantially as shown and described in said application. The under-thread carrier 51 will be actuated in the formation of the stitch by means fully described in said application, so that the parts common to the machine shown in said patent and said application need not be herein more fully described.

We will now proceed to describe the particular features wherein our invention consists. In the first instance we have combined with the needle-bar $b'$ a cam-bar $g$, it sliding with the needle-bar in the casing 34 and through the pinion 39, the lower end of said cam-bar being beveled, as shown at $g'$. The pinion 39 sustains from its under side a stand $g^2$, having a pivot $g^3$ for one member $g^4$ of a compound or universal lever, the other member $g^5$ of said lever being shown as pivoted at $g^6$ upon the member $g^4$. The member $g^5$ is provided with a slot $g^7$, which is entered by a stud $g^8$, extended from the needle-bar, and said member $g^5$ is bored to receive the upper end of a device or finger $g^9$, it in practice carrying the purl-thread $g^{10}$, said purl-thread being led from a suitable spool (not shown) through an eye $g^{12}$, connected to the stitch-frame, through a guide $g^{13}$, connected and moving with the pinion 39, and thence to a suitable tension device, which for simplicity may be composed of two disks $m$, (see Fig. 1,) mounted upon a threaded stud, said disks being controlled as to the extent of their pressure on the thread by a suitable nut $m^2$, acting upon a spring $m'$, and from the tension device the purl-thread goes through a guide-eye $g^{15}$ (see Figs. 3 and 4) and thence through an eye in a substantially horizontal projection at the lower end of said finger. The upper end of said finger is passed through a slide-block $h$, (see Fig. 2$^b$,) a portion of said block entering and being free to slide in a slot $h'$ in the member $g^5$, said finger being connected with said block by or through a suitable set-screw $h^2$, the inner end of which enters a threaded hole in said block. A spring $h^3$ acts normally to depress the finger, the contact of a lifter $h^4$ with the screw $h^2$ of the block $h$ lifting the finger. The finger-lifter $h^4$ is shown as a lever having a curved end $h^{4\times}$ and pivoted at $h^{40}$ in a bracket $h^7$, the lifter being turned by a link $h^5$, connected with the end of the lever F, common to United States Patent No. 655,637, said lever F being moved at the completion of each buttonhole.

It will be understood that the stitching mechanism herein described rotates during the stitching operation, and consequently the needle-bar and the stud $h^2$, extended from the block $h$, also rotate.

The forward end of the lifter $h^4$ is curved at $h^{4\times}$ to partially surround the needle-bar, and when a buttonhole has been stitched the screw $h^2$ in the rotation of the stitch-forming means arrives in position above the curved end of the lifter, and the latter is then moved, through the lever F, to lift the purl-thread guide, this being done at the completion of the stitching operation. During the return movement or the backward rotation of the needle-bar into starting position the screw $h^2$ rides upon the curved end of the lifter, the latter being thereby prevented from descending, except after the stitch-forming mechanism has approximately arrived in its position to again commence the stitching of a buttonhole. The member $g^5$ is swung about its pivot $g^6$ in one direction by the roller-stud $g^8$, and at suitable times in the making of the stitch the member $g^4$ is swung about its pivot $g^3$ by the contact of the beveled end $g'$ of the bar $g$ with a toe $h^8$, (see Figs. 4 and 5,) projecting inwardly from the member $g^4$, a suitable spring, as $h^9$, acting normally to maintain the toe of the member $h^4$ in the line of movement of said bar. A second spring $h^{10}$, connected at one end with the upper end of the member $g^5$ and at its opposite end with the member $g^4$, acts to maintain the member $g^5$ in a defined position when not under the influence of the stud $g^8$.

Figs. 6 to 15 show different positions of the upper needle and complemental under-thread-carrying means coöperating therewith to form the stitch, together with the finger constituting the purl-thread guide, said figures also showing part of a garment, as $m^3$, containing a slit $m^4$, cut therein, the edge of which is to be overstitched, as represented in Figs. 16 and 17. Referring to these figures, let it be supposed that the garment $m^3$ or material which is to have made in it the overedge-stitch is clamped in the usual clamp $c$ $c'$ (partially shown in Figs. 1 and 3) with what is to be the inner side of the garment lowermost, that part of the garment which is to constitute its outer side or face and is to be exposed being uppermost in the clamp. When the work is clamped, the upper needle $b'^{\times}$ occupies its highest position, as shown in Fig. 2, the complemental stitch-forming means (shown as an under-thread carrier 51) occupying its lowermost position, the purl-thread guide occupying the position shown in Figs. 2 and 3.

Figs. 6 and 7 show the purl-thread guide in its normal position, the under-thread carrier having been thrust for a part of its length through the slit $m^4$, said carrier entering a loop $m^5$ of needle-thread at the under side of the garment held in the clamp. The carrier 51 continues to rise until it arrives in the positions Figs. 8 and 9, where the eye of said carrier is placed beyond the path of movement of the upper needle $b'^{\times}$, and then the under-thread carrier is retracted somewhat, sufficiently to throw out from its eye a loop in the under thread, in which the upper needle may enter as the latter approaches the garment, as in Figs. 10 and 11; but before the upper needle reaches the position Figs. 10 and 11 the purl-thread guide is moved from the positions Figs. 7 and 9 in a somewhat circular path and back of or away from the edge being overstitched into the position Fig. 11, and during this movement of the finger it will be seen that the purl-thread is drawn about the shank of the under-thread carrier, so that the purl-thread while in contact with said under-thread carrier is enabled to act on the upper thread and draw the same to the upper edge of the slit, the purl-thread lying at that edge and crossing the loop of needle-thread and the loop of under thread near the loop of upper thread and also holding the interlocking parts of the under and upper thread at the upper edge $m^6$ of the garment, as shown in Figs. 14 to 16. The under-thread carrier stands substantially in the position Figs. 11 and 13, and the upper needle in the loop of under thread is made to pass through the material, and thereafter while said upper needle is in the material the under-thread carrier is retracted or drawn downwardly through the slit $m^4$ into its normal position, (see Fig. 14,) and in so moving the under thread is laid about the upper thread then in the material. After the upper needle has descended to its lowest point it is raised sufficiently to throw out a loop of its thread, which is entered by the usual looper 52 in its active movement, said looper drawing said loop, opening the same, and holding it for the under-thread carrier 51 to enter as the latter again rises through the slit in the formation of a second stitch, said under-thread carrier leaving the upper thread at the edge of the slit at the under side of the material. About as the point of the upper needle in its ascent rises above the material the purl-thread guide or finger starts from the position Figs. 11 and 13 and moves back to its normal position, Figs. 7 and 9, and in its movement it passes partially around the loop of upper thread then caught in the material, said finger reaching its normal position before the under-thread carrier rises above the material, so that the latter may rise between the edge of said material and the said purl-thread and at the side thereof farthest from the last stitch, the purl-thread guide being then again moved, as described, into the position Figs. 11 and 13 for the production of another stitch.

Viewing Figs. 14 and 16, it will be seen that the under thread $n$ has drawn the upper thread $n'$ to the under edge $n^2$ of the garment, so that said threads are interlaced at said edge, as in ordinary overedge stitching-machines, and also that the upper thread $n'$ at the exposed face of the material is through the action of the purl-thread drawn to the upper edge $m^6$ of the slit to thereby leave a defined purl at the upper side of the garment held in the clamp and being stitched. The seam herein illustrated has been made the subject of an application, Serial No. 64,383, filed on the 13th day of June, 1901.

Fig. 17 shows a piece of garment cut to form a buttonhole-slit, the slit being overstitched, the overstitching representing the upper side of the material in the clamp, the stitch shown in Fig. 17 being the same as that represented in Fig. 16, only the stitches are made close togther, so as to thoroughly cover the edge of the slit.

It will be understood that the left-hand end of the three-armed lever F is lowered when the machine is automatically stopped, as provided for in said patent.

Having described our invention, what we claim as new, and desire to secure by Letters Patent, is—

1. In an overedge stitching-machine, a work-clamp to hold the material, stitch-forming mechanism comprising an eye-pointed upper-thread carrier, a complemental device carrying a second or under thread, a purl-thread guide, and actuating means to move said purl-thread guide in one direction to draw the purl-thread carried thereby about the under-thread carrier, said purl-thread guide when being returned to its starting position acting upon the thread of the upper-thread carrier connected with the material and drawing the same to the edge of the slit at the upper side of the material.

2. In an overedge stitching-machine, stitch-forming mechanism comprising an eye-pointed upper-thread carrier, and a complemental device carrying a second or under thread, a finger provided with a purl-thread, and a compound lever and actuating means therefor to reciprocate said finger and cause it to draw the purl-thread carried by said finger about the under-thread carrier.

3. In an overedge stitching-machine, stitch-forming mechanism, including an upper needle and complemental under-thread-carrying means, a purl-thread guide located above the material, a clamp to receive the garment to have its edge overstitched with its outer face uppermost, and means to rotate said stitch-forming mechanism while stitching about the enlarged end of the eye thereof.

4. In an overedge stitching-machine, stitch-forming mechanism including an upper needle and complemental under-thread-carrying means, a purl-thread guide located above the material, a clamp to receive the garment to have its edge overstitched with its outer face uppermost, means to rotate said stitch-forming mechanism for more than a full rotation during each stitching operation, said stitch-forming mechanism being thereafter returned to its normal position.

5. In an overedge stitching-machine, stitch-forming mechanism comprising an eye-pointed upper-thread carrier, and a complemental device carrying a second or under thread, a purl-thread guide, a compound lever for carrying said purl-thread guide, actuating means to move said thread-guide to draw the purl-thread carried by it about the under-thread carrier, and means to lift automatically said purl-thread guide at the completion of a buttonhole.

6. In an overedge stitching-machine, a needle-bar having an eye-pointed needle, complemental stitching devices coöperating therewith, a pinion splined to said needle-bar, means to rotate said pinion and needle-bar, means to reciprocate said needle-bar in said pinion, a purl-thread guide carried by said pinion and a means carried by said needle-bar and operative during the reciprocations thereof to reciprocate said purl-thread guide during the formation of each stitch.

7. An overedge stitching-machine, comprising a needle-bar, means to reciprocate and to rotate said needle-bar during the operation of stitching, a purl-thread guide rotatable with said needle-bar and presenting a finger to carry a purl-thread, a spring acting normally to depress said finger, a projection extended from said finger, a lifter, and means to move it automatically to meet said projection and lift the finger.

8. An overedge stitching-machine, comprising a needle-bar, means to reciprocate and to rotate said needle-bar during the operation of stitching, a purl-thread guide rotatable with said needle-bar and presenting a finger to carry a purl-thread, a spring acting normally to depress said finger, a projection extended from said finger, a lifter having a curved end, means to move said lifter to raise the finger, said lifter sustaining said finger in its inoperative position while the needle-bar is being rotated backwardly into its starting position.

9. In an overedge stitching-machine, a needle-bar having an eye-pointed needle, means to rotate it while overstitching curved edges, a complemental under-thread carrier, a purl-thread guide having a projecting stud which occupies a defined position at the completion of each stitching operation of the machine, and means to automatically engage said stud and lift the purl-thread guide at the completion of a buttonhole.

10. In an overedge stiching-machine comprising an eye-pointed upper-thread carrier, and a complemental device carrying a second thread, a pinion through which the needle-bar carrying the upper-thread carrier is reciprocated, said pinion having a connected stand, means to rotate said pinion and with it the needle-bar and needle, a purl-thread guide supported upon said stand, and a tension device sustained by said stand.

11. In an overedge stitching-machine, the following instrumentalities, viz: an upper-thread-carrying needle, a complemental under-thread carrier, a cloth-clamp, a purl-thread guide, actuating means for said needle and under-thread carrier, means to move said purl-thread guide that it may bend its thread about the under-thread carrier to form a loop in the purl-thread for the entrance of the upper needle, said parts being actuated to form a stitch wherein the needle-thread is laid on the upper and lower sides of the material for the length of the depth-stitch, said under thread interlocking the bights of upper thread at the under side of the material in the clamp, said under thread with the purl-thread interlocking the bights of the upper thread on the upper side of the material in the clamp.

12. An overedge stitching-machine, comprising a purl-thread-carrying finger mounted loosely in a lever having a slot, a stand, a lever mounted on said stand and sustaining the lever provided with the slot, combined with a reciprocating bar having a cam projection and a stud, means for actuating said bar, the cam projection meeting the lever mounted on the stand, and the stud entering the slot of the lever carrying the purl-thread guide, the bar in its reciprocations imparting a to-and-fro movement in a curved path to the extremity of the purl-thread guide, and a spring connected with said stand and the lever pivoted thereon to move said lever in opposition to the cam of said bar.

In testimony whereof we have signed our names to this specification in the presence of two subscribing witnesses.

CHARLES A. DAHL.
WILLIAM W. DIXON.

Witnesses:
GEO. W. GREGORY,
EDITH M. STODDARD.